Oct. 8, 1968     H. H. JEWETT ET AL     3,405,334
ELECTROSTATIC POWER GENERATOR DRIVEN BY PNEUMATIC POWER MEANS
Original Filed Dec. 12, 1963     3 Sheets-Sheet 2

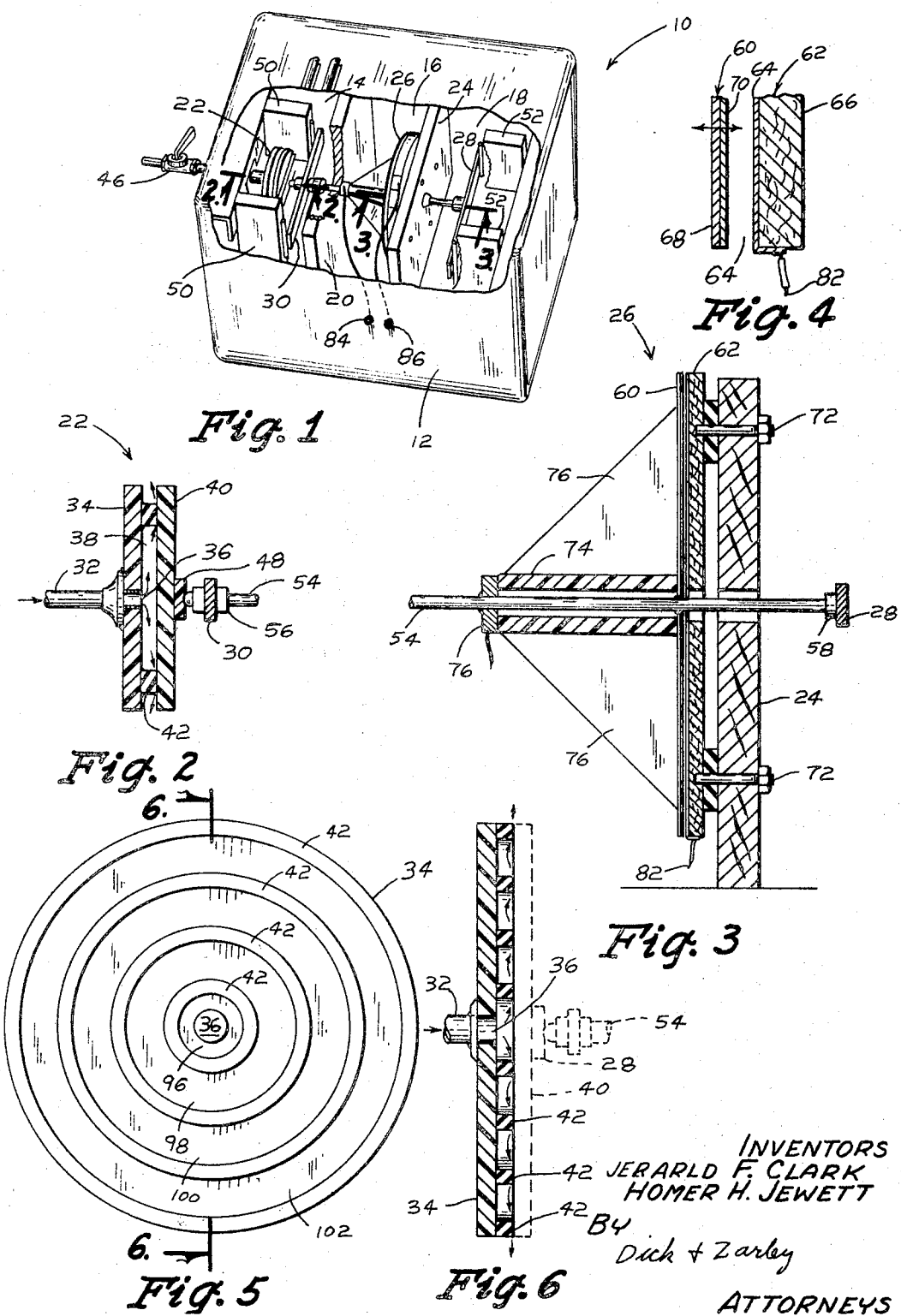

INVENTORS
JEARLD F. CLARK
HOMER H. JEWETT
BY
Dick + Zarley
ATTORNEYS

Oct. 8, 1968  H. H. JEWETT ET AL  3,405,334
ELECTROSTATIC POWER GENERATOR DRIVEN BY PNEUMATIC POWER MEANS
Original Filed Dec. 12, 1963  3 Sheets-Sheet 3

INVENTORS
JEARLD F. CLARK
HOMER H. JEWETT
BY Dick + Zarley
ATTORNEYS

3,405,334
ELECTROSTATIC POWER GENERATOR DRIVEN BY PNEUMATIC POWER MEANS
Homer H. Jewett, 4244 Harwood Drive 50312, and Jerald F. Clark, 3203 62nd St. 50322, both of Des Moines, Iowa
Continuation of application Ser. No. 330,177, Dec. 12, 1963. This application Mar. 6, 1967, Ser. No. 621,065
13 Claims. (Cl. 317—250)

ABSTRACT OF THE DISCLOSURE

A variable capacitor driven by pneumatic means. The driving linkages and return springs are operatively connected so as to drive an electrode plate of the capacitor at the resonant frequency of the pneumatic means.

---

This application is a continuation of Ser. No. 330,177 filed Dec. 12, 1963, now abandoned.

This invention relates to electrostatic generators and in particular to the type wherein the plates are enclosed in a vacuum chamber and their separation is varied to produce a current and consequently electrical power. Additionally this invention is concerned with the means for varying the distance between the generator plates.

Electrostatic power generators are believed to not only have application in the space field but also may prove to be an ideal land based power plant for industrial electrical power needs.

Electrostatic generators have two chief advantages over electromagnetic generators. First, the power to mass ratio will exceed 1 kw. per pound. Clearly this is a vital factor in our space programs. Secondly, the electrostatic machines can operate with an efficiency well above 95%. Some have had an efficiency of over 99%. The primary factor accounting for this high degree of efficiency is the absence of the I²R or copper loss which is necessarily present in the operation of electromagnetic machines. The reason of course is that the internal impedance of the electrostatic machine is almost entirely reactive as opposed to the highly resistive impedance in the electromagnetic machines.

A great deal of research has been performed in attempting to perfect the rotating type of electrostatic generator. However, this type of machine has numerous inherent drawbacks as compared to the vibrating type of this invention. The vibrating type machine may be characterized as one with only one of the plates of each capacitor moving relative to the other or both plates moving towards and away from each other.

Because of spaces between blades in the rotating type the area of the rotor plate will be approximately one half of the area of the full plate or disc. Moreover, the minimum clearance or distance between the rotor and the stator is larger than in the vibrating type machine. The available current for the same size plates in the two types of machine will be more than twice as much in the vibrating machine. Since true power output depends upon the internal voltage drop of the machine and the internal impedance of the vibrator is substantially less than that of the rotating machine the output voltage regulation is greatly improved.

Mechanical considerations indicate that maintaining a vacuum seal around the rotating shaft is much more of a problem in the rotating machine due to the high friction than providing a seal around a push rod which moves longitudinally of the vibrating machine a very small distance. Also, rotative mechanical power is not required for the vibrating machine. In fact a prime mover is not even required. A reactor or a solar heat source may be utilized for supplying hot gases directly ot the vibrating diaphrams. It is understood however that conventional power sources such as a gas turbine or a steam boiler may be employed to drive the push rod.

The space requirements for the vibrating machine will be less than for the rotating machine since the plates of the vibrating machine may be made of a thinner material which proves to be especially important when they are stacked along a common axis. Also, the plate clearance being less will account for a substantial savings in space for the vibrating type machine.

In order that advantage be taken of the high dielectric constant of materials such as BaTiO₃ having a K value of 2000, it is necessary that the plates comprising the two electrodes of the capacitor have no space between them at minimum separation. Only the ceramic film will separate the plates. If space is permitted, then two capacitors are in effect provided, one with air or vacuum and the other with the ceramic material. This of course is undesirable since two capacitors in series provide a total capacitance which can never exceed the smaller of the two. Accordingly since there can be no contact whatsoever between the plates in a rotating generator, the full potential of the high value dielectric materials cannot be realized when used in these machines.

In instances where flatness of the electrode contact surface may be difficult to obtain, for example when one surface is coated with BaTiO₃, the opposite electrode surface may be coated with silicone rubber which is allowed to conform to the hills and valleys of the ceramic material before hardening. In this manner a multiple plate vibrator may be built without the need of ever taking it apart and disturbing the intimate contact of the electrode plate surfaces. Where it is possible to govern the compression strength or elasticity of the rubber base material, it is posible that the resonant frequency of the system can be establish without the need of additional springs. The foregoing contemplates a relatively low voltage high current machine. However, it is understood that machines may be constructed without utilizing the barium titanate film and employing instead bare electrodes separated by a small vacuum space. In this type of machine the output would be essentially high voltage with low current.

It is further contemplated that the power per pound ratio (power to mass ratio) for the vibrating type machine will be considerably more than that of the rotating type machine.

Various types of transducers may be employed for driving the vibrating machine including among other means, pneumatic means such as a single pressure diaphragm, a multiple pressure diaphragm, or a multiple free reed.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings several embodiments of the invention have been shown.

FIG. 1 is a perspective view of one embodiment of the electrostatic generator of this invention with a portion of the housing broken away to more clearly illustrate the working parts enclosed therein;

FIG. 2 is a cross-sectional view taken along line 2—2 of the single pressure diaphragm transducer employed in the electrostatic generator shown in FIG. 1;

FIG. 3 is a cross-sectional view taken along line 3—3 in FIG. 1 of the electrostatic generator electrode plates and in particular showing the push rod fixedly secured to one of the movable electrode plates;

FIG. 4 is an enlarged view of a portion of the electrode plate illustrated in FIG. 3;

FIG. 5 is an elevation plan view of the inside face of one of the diaphragm members in a multiple pressure diaphragm pneumatic transducer assembly;

FIG. 6 is a cross-sectional view taken along line 6—6 in FIG. 5 showing in particular the movement of air through the diaphragm member and outwardly to the peripheral edge thereof over a series of concentric annular rings;

Figures 7, 8:
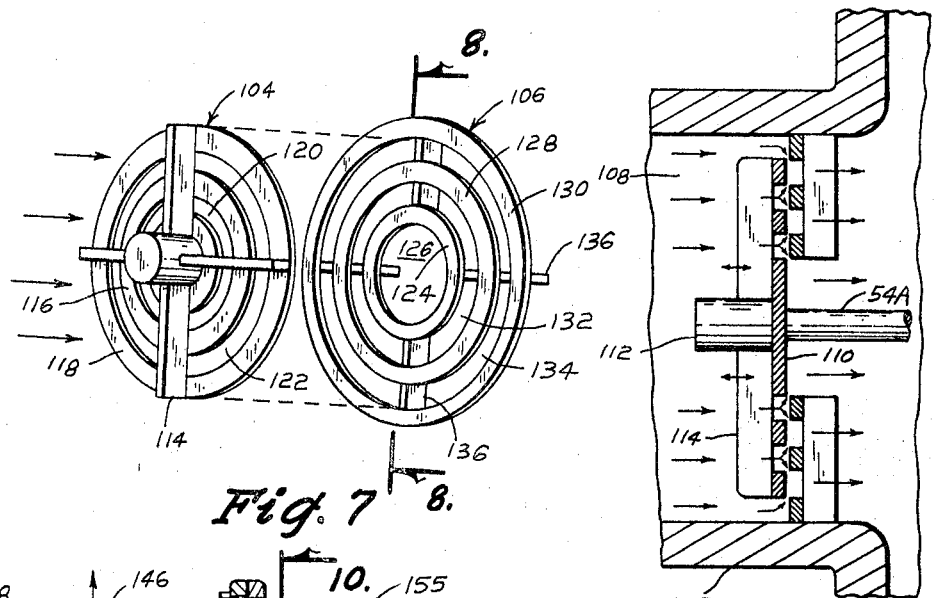
FIG. 7 is a perspective view of a multiple free reed pneumatic transducer assembly.
FIG. 8 is a cross-sectional view taken along line 8—8 in FIG. 7 of the multiple free reed pneumatic transducer assembly shown in a position inside the chamber of a housing.

In FIG. 1 of the drawings, one embodiment of an electrostatic generator of this invention is referred to by the reference numeral 10 and comprises a housing 12 having formed therein three chambers 14, 16 and 18. A wall 20 cooperates with one of the end walls of the housing 12 to form the chamber 14 which houses the pneumatic transducer means 22. The wall 20 also cooperates with another wall 24 to provide a vacuum chamber if desired for the capacitor plate assembly 26. And lastly, the wall 24 cooperates with the other end wall of the housing 12 to form the chamber 18 for one portion of the return spring assembly 28 which in turn cooperates with the spring assembly 30 in the chamber 14 to movably support and yieldingly hold the capacitor plates of the capacitor plate assembly 26 in a separated relationship to each other.

The pneumatic transducer assembly 22 is best shown in the drawings in FIG. 2 to comprise an air inlet conduit 32 which is fixedly secured to a flat circular disc-like member 34. A passageway 36 is formed through the disc-like member 34 and is in communication with a diaphragm chamber 38 formed by a movable diaphragm member 40 held in spaced relationship therefrom by an annular resilient rubber or the like ring 42 secured to the inner face of the flat member 34. A valve control unit 46 (FIG. 1) is provided in the air tube 32 to control the flow of air therethrough.

A strengthening member 48 in the form of an elongated flat bar-like element extends diametrically across the rear side of the diaphragm member 40.

In each of the chambers 14 and 18 are a pair of upstanding block elements 50 and 52 respectively. A push rod 54 extends through the walls 20 and 24 and engages at its ends each of the spring bars 28 and 30 thereby flexing them outwardly. As shown in FIG. 2, the push rod 54 is rigidly secured and extends through a collar 56 which in turn is rigidly connected to the spring bar 30. The outer adjacent rounded end of the push rod 54 bears against the strengthening bar member 48 on the back side of the diaphragm member 40. The opposite end of the push rod 54 is seated in a collar portion 58 integrally connected to the spring bar 28 (FIG. 3).

The capacitor plate assembly 26 in chamber 16 includes a movable electrode unit 60 and a stationary unit 62 which are separated by a varying gap 64 (FIG. 4). An electrical conducting surface 64 is provided on one surface of a backing member 66 forming the stationary electrode unit 62. The movable unit 60 comprises a backing member 68 and an electrical conducting metallic surface or the like 70. The stationary electrode unit 62 is secured to the wall 24 by bolts 72. On the other hand, the movable electrode unit 60 is secured to the push rod 54. A sleeve 74 embraces the push rod 54 and is held thereon by a washer-like element 76, which is welded to the push rod 54. Triangular shaped brace members 76 extend along the length of sleeve 74 and along the back surface of the back member 68 thereby providing the necessary structural strength for the electrode unit 60. The terminal 80 is connected to the electrode conducting surface 70 through the washer-like element 76 and the conducting surface 64 of the stationary electrode unit 62 is connected to a terminal wire 82. The electrical lead wires 80 and 82 extend from the electrode units 60 and 62 respectively to terminal elements 84 and 86 mounted on the outside of the housing 12 (FIG. 1).

In operation, an air source (not shown) supplies air to the air tube 32 which escapes into the diaphragm chamber 36 and forces its way between the annular ring 42 and the movable diaphragm member 40 (FIG. 2) and thereby causes the push rod 54 to be moved to the right as shown in FIGS. 1, 2 and 3, carrying with it the movable electrode unit 60 and consequently bringing the conducting surface 70 closer to the conducting surface 64 on the stationary electrode unit 62. This action occurs against the spring resistive action of the spring plate members 28 and 30 which tend to move the push rod and the movable electrode unit 60 to the left. Thus, the single pressure diaphragm transducer means 22 will alternately move the capacitor conducting surfaces 70 and 64 close together while the return spring members 28 and 30 will separate the capacitor electrode units 60 and 62. By operating the control valve 46, the vibrations of the diaphragm member 40 may be controlled to correspond to the resonant frequency for the return spring bars 28 and 30.

Figure 14:
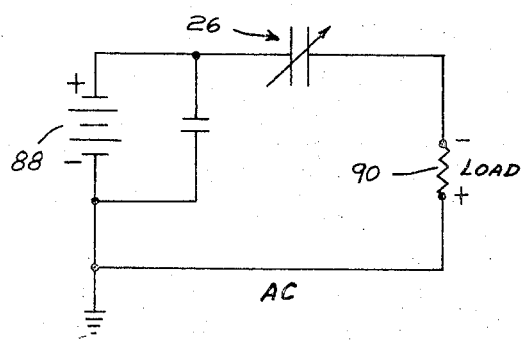
FIG. 14 is an electrical schematic for a two plate vibrator generator such as the one illustrated in FIGS. 1 and 3 wherein an alternating current output is produced.
Figure 15:
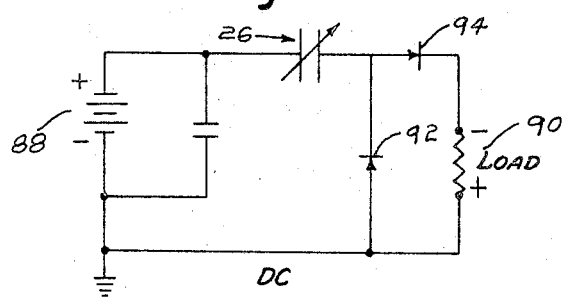
FIG. 15 is an electrical schematic similar to FIG. 14; however, showing the wiring for a direct current output.

In the schematic drawings of FIGS. 14 and 15 wiring diagrams are shown for use with the electrostatic generator of FIGS. 1 through 4. The capacitor plate assembly 26 receives an input voltage from a power supply 88 and delivers alternating current power to a load 90. In FIG. 15, the alternating output current from the electrostatic generator capacitor plate assembly 26 is rectified by a pair of rectifiers 92 and 94.

In FIGS. 5 and 6, a multiple pressure diaphragm pneumatic transducer means is illustrated. In FIG. 6 the components to the right of the stationary diaphragm member 34 are common to the construction shown in FIGS. 1 through 4 and are illustrated by the dash lines. This includes the movable diaphragm plate 40 secured to the push rod 54. The stationary diaphragm member 34 connected to the air inlet tube 32 has a plurality of annular rings 42 concentrically disposed around the inlet passageway 36. Thus the air indicated by the arrows in FIG. 6 moves through the passageway 36 into the space 96 provided within the first ring 42 and between the diaphragm members 34 and 40. Next the air passes across the outer face of the annular ring 42 into the next annular chamber or space 98 and successively outwardly through each of the annular chambers 100 and 102 where the air finally escapes from between the diaphragm members 34 and 40. Through this construction it is obvious that considerably more usable power is available for driving the push rod 54 thereby making it possible to use capacitor plates having larger areas or as an alternative, mounting a series of movable capacitor plates on the push rod 54 as will hereinafter be described.

In FIGS. 7 and 8 a multiple free reed pneumatic transducer means is illustrated comprising a movable diaphragm member 104 carried on a push rod 54A and a stationary diaphragm member 106 secured in a chamber 108 in an air inlet conduit 109. It is to be understood that the converse construction may be provided wherein the push rod 54A is secured to the member 106 and the member 104 is secured to the inside wall of the conduit 109. However, as illustrated, the movable diaphragm member 104 comprises a circular center disc 110 connected at its center to the push rod 54A. On the opposite side of the disc 110 a cylindrical member 112 is provided to which is secured a plurality of radial ribs 114 which in turn are secured to annular disc-like elements 116 and 118 disposed in space concentric relationship around the center disc 110 thereby providing annular slots 120 and 122. The disc member 106 is designed to matingly receive the member 104. It is provided with a center circular ring element 124 with an opening 126 formed therein to receive the disc 110 of the member 104. Ring elements 128 and 130 are disposed and spaced in concentric relationship around the first ring element 124 and, accordingly, provide slots 132 and 134 for receiving the ring elements 116 and 118 respectively of the member 104. Radial ribs 136 are provided along axis normal to each other for securing the elements of the diaphragm member 106 together. The member 106 is secured along the peripheral edge of the element 130 by any suitable means such as a friction press fit within the chamber 108 or by weldments or the like. In operation, the arrows shown in FIGS. 7 and 8 indicate the direction of movement of the air through the movable free reed transducer. In FIG. 8 the air passes from the left of the chamber 108 through the slots 120 and 122 over each of the peripheral edges of the ring elements 124, 128 and 130 thereby causing the push rod 54A to be reciprocated and consequently drive the capacitor plate carried thereon (not shown).

Figure 9:
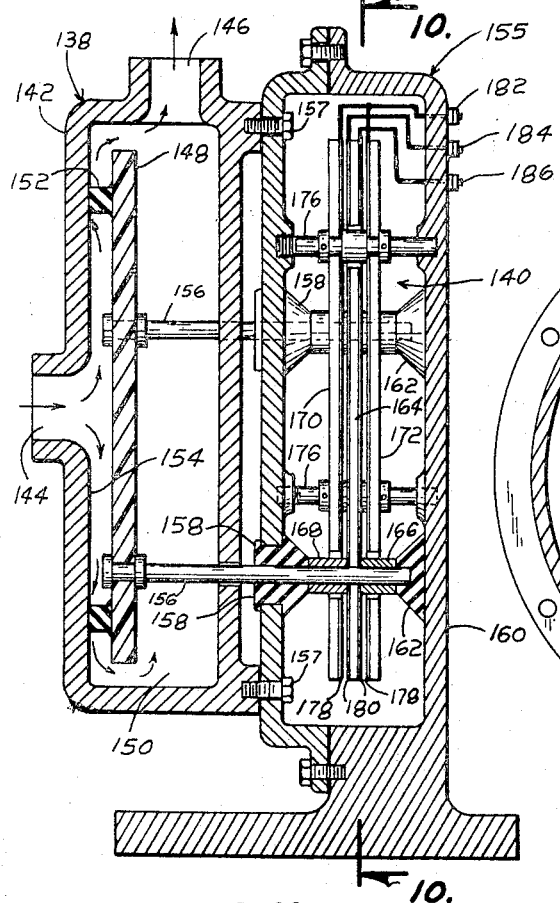
FIG. 9 is a side elevation view of an electrostatic generator taken along line 9—9 in FIG. 10 showing in particular a single pressure diaphragm transducer assembly driving a capacitor plate between a pair of stationary electrode plates.
Figure 10:
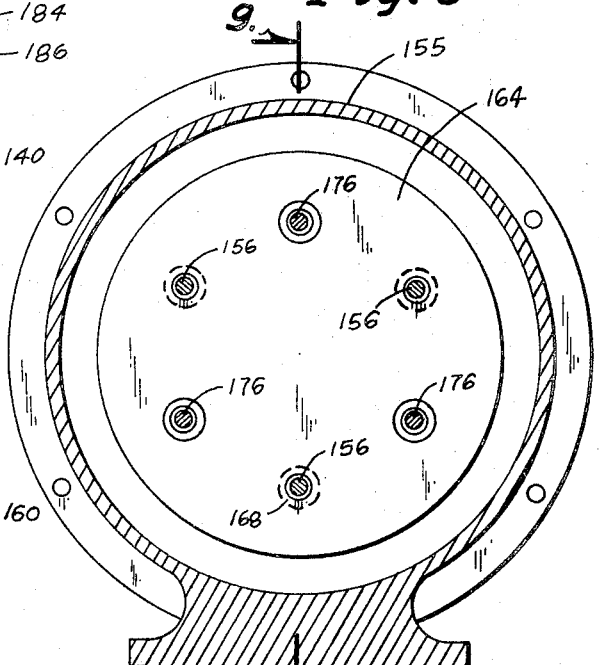
FIG. 10 is an elevation cross-sectional view taken along line 10—10 in FIG. 9.

In FIGS. 9 and 10 an embodiment of this invention is shown which comprises a single pressure diaphragm assembly 138 coupled to a multiplate capacitor assembly 140. The single pressure diaphragm assembly 138 includes a housing 142 having an air inlet port 144 and an exhaust port 146. A movable diaphragm member 148 is provided in a chamber 150 within the housing 142. An annular resilient rubber or the like ring 152 is secured to the diaphragm member 148 in concentric relationship about the air inlet opening 144 and is adapted to bear against the inside wall surface 154 of the housing 142. As shown more clearly in FIG. 10, three push rods are secured and uniformly spaced around the diaphragm member 148 and extend outwardly of the housing 142 into a capacitor plate assembly housing 155. The capacitor plate housing 155 is secured to the diaphragm housing 142 by bolts 157. Openings are provided in the side walls of the capacitor housing 155 to receive the push rods 156. To seal these openings, flexible resilient vacuum seals 158 are provided through which the push rods 156 extend. The seals 158 are similar to grommets. The opposite side wall 160 of the housing 156 is provided with resilient rubber seat-like elements 162 and receives the free end of the push rods 156. An electrode member 164, circular in plan view (FIG. 10) is fixedly secured to each of the push rods 156 and has collars 166 and 168 bearing against opposite faces thereof. The other ends of the collars bear against the resilient grommet and seat elements 158 and 162. Also within the housing 155 a pair of stationary electrode plates 170 and 172 are mounted on opposite sides of the movable electrode plate 164. The plates 170 and 172 are secured to the opposite side walls of the housing 155 by rod-like elements 176. Each of the stationary electrode plates 170 and 172 have conducting surfaces 178 facing each other and facing the movable electrode member 164. Similarly opposite faces of the movable electrode member 164 are covered with electrical conducting material 180. Lead wires extend from the conducting surfaces 178 on the stationary capacitor plates 170 and 172 to an external terminal 182 and similarly opposite conducting surfaces 180 on the movable electrode 164 are connected to terminals 184 and 186.

Thus it is seen that the generator of FIGS. 9 and 10 is capable of greater power generation of virtue of its having a plurality of stationary plates between which a movable electrode moves. The air is introduced into the diaphragm chamber 150 through the inlet port 144 and vibrates the diaphragm member 148 as the air escapes past the annular resilient rubber ring 152 and out through the exhaust or outlet port 146. As the member 148 is vibrated, the forces are transmitted through the push rods 156 to the movable electrode member 164 which is positioned midway between the stationary plates 170 and 172. The space between the electrode plates will depend upon the resiliency of the rubber seats 162 on which the push rod members 156 bear, and the air pressure against the diaphragm member 148. Additionally, an important consideration in the spacing of the capacitor plates is the amplitude of vibration desired. It has been found that 0.002 inch minimum clearance for high voltage vibrating machines can be maintained in a vacuum capacitor chamber where 0.001 inch of Mylar dielectric film material has been provided on one of the electrode surfaces. At that separation the capacitance of a five inch vibrator would be 1800 $\mu\mu f$. With an amplitude of vibration of 0.003 inch the maximum separation would be 0.005 inch and at that distance the capacitance has dropped to 800 $\mu\mu f$. The capacitance variation would then be 1800 minus 800 or 1000 $\mu\mu f$.

The output power for this machine may be calculated from the equation $$P = fV\frac{C^2}{4C}$$

where $f$ equal the frequency, V the maximum voltage across the gap and C the variation in capacitance.

Figure 11:
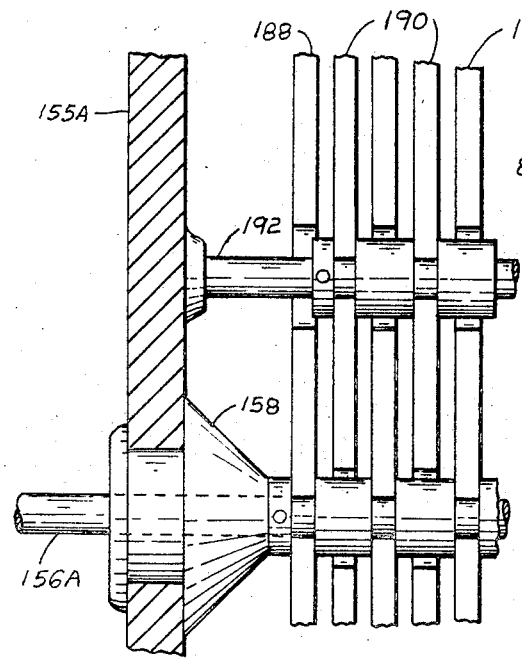
FIG. 11 is a fragmentary side elevation view partially in cross-section showing still another embodiment of the capacitor plates of an electrostatic generator wherein a series of movable plates are stacked alternately with a series of stationary electrode plates.

In FIG. 11 of the drawings it is shown that it is possible to assemble as many combinations of movable capacitor electrodes between pairs of stationary electrodes as may be desired. A capacitor housing 155A is shown with a push rod member 156A extending through a grommet seal 158 mounted in the wall of the housing 155A. Movable electrode plates 188 are provided mounted on the push rods 156A (only one push rod being shown) and spaced between stationary capacitor plates 190 which are secured to the housing 155A by pin members 192 (only one of which is shown).

Figure 12:
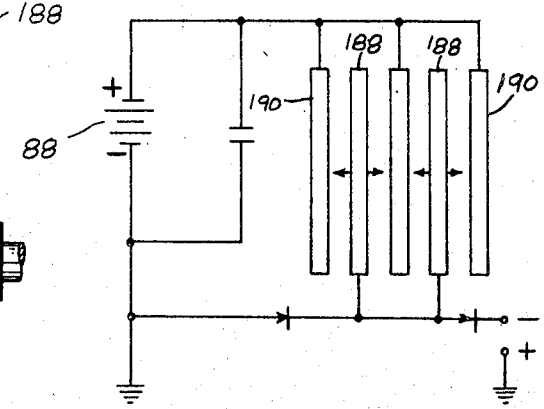
FIG. 12 is an electrical schematic for a multiple plate vibrator such as shown in FIG. 11 wherein all of the plates are of solid conducting material.
Figure 13:
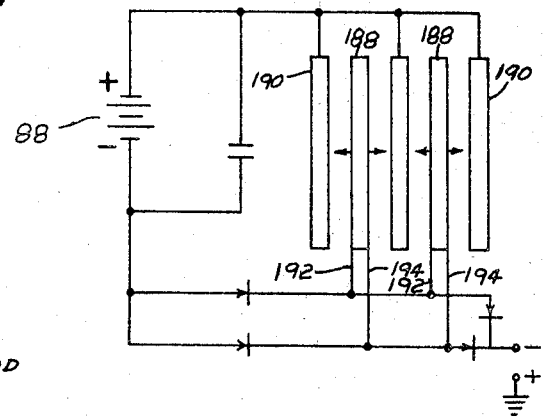
FIG. 13 is an electrical schematic having a multiple plate vibrator with the stator plates of solid conducting material and the moving plates with conducting surfaces only.

In the electrical schematic drawing of FIG. 12, the movable electrode plates 188 are of solid conducting material and move between the stationary plates 190; however, in FIG. 13 the movable electrode plates 188 have separate conducting surfaces on opposite sides and therefore lead wires 192 and 194 extend from each of the movable electrode plates 188.

It is contemplated that use will be made of the high dielectric constant of material such as $BaTiO_3$ which will be applied to one of the plates of each pair of plates as hereinbefore described. The compactness of a machine of this type is illustrated by the following example: Where the resilient coating is 0.02 inch in thickness and the plates themselves are 0.06 inch thick, then in stacking together 50 plates they would occupy a space of approximately 4¼ inches in thickness. Assuming the diameter of the plates to be five inches, conventional calculations for power will indicate that the output would be 245 amperes at 300 volts, or 74 kw. If the plates are of aluminum the combined weight of the plates and the coatings would be about nine pounds. The vibrator type machine of this invention may be operated at any desired frequency. There is no theoretical reason why it cannot be tuned to 10 or 20 kc. The output power for a given size machine will, of course, vary directly with the frequency of reciprocation of the movable electrode plates.

We claim:
1. In an electrostatic generator, comprising:
   a variable capacitor having a pair of electrode plates,
   a voltage applied across said electrode plates,
   a pneumatic power means having a pair of parallel plates with a ring means therebetween, air means for forcing air between said pair of plates and moving one of said plates of said pneumatic power means,
   a push rod means connected between one of said electrode plates and one of the plates of said pneumatic power means, and
   spring means operatively connected to said push rod for opposing the force of said pneumatic power means whereby said one pneumatic plate is vibrated and said vibrations are transmitted by said push rod means to said one electrode plate to cause it to move towards and away from the other of said electrode plates, and said one electrode plate, push rod and spring means are mechanically resonant at the same frequency as said one plate of said pneumatic power means.

2. The structure of claim 1 wherein said pair of electrode plates are parallel to each other and said other plate is stationary relative to said one electrode plate.

3. In an electrostatic generator, comprising:
   a variable capacitor having a pair of spaced parallel stationary electrode plates, and a third movable electrode plate disposed between said pair of plates and parallel thereto,
   a voltage applied between said third plate and each of said stationary plates,
   a pneumatic power means having a pair of parallel plates with a ring means therebetween, air means for forcing air between said pair of plates and moving one of said plates of said pneumatic power means,
   a push rod means connected between said third electrode plate and one of the plates of said pneumatic power means, and
   spring means operatively connected to said push rod for opposing the force of said pneumaitc power means whereby said one pneumatic plate is vibrated and said vibrations are transmitted by said push rod means to said third electrode plate to cause it to move towards and away from said pair of electrode plates, and said third electrode plate, push rod and spring means are mechanically resonant at the same frequency as said one plate of said pneumatic power means.

4. The structure of claim 1 and means for varying the amplitude of movement of said one plate of said pneumatic power means.

5. The structure of claim 1 and a vacuum chamber, said pair of electrode plates being positioned in said vacuum chamber and means for applying a vacuum to said vacuum chamber.

6. The structure of claim 1 wherein said other plate of said pair of plates of said pneumatic power means is stationary and has an inlet opening in the center thereof, said air means being in communication with said inlet opening, and said ring element is disposed concentrically around said inlet opening.

7. The structure of claim 1 wherein said other plate of said pneumatic power means includes an inlet opening in the center thereof, said air means being in communication with said inlet opening, said other plate of said power means being one of a plurality of laterally spaced apart ring elements concentrically disposed around said inlet opening, and said ring elements being secured to said other plate of said power means.

8. In an electrostatic generator, comprising:
   a variable capacitor having a pair of electrode plates,
   a voltage applied across said electrode plates,
   a pneumatic power means having a pair of parallel plates each having surfaces and openings, the surfaces and openings of one plate being in registry with the openings and surfaces of the other plate, air means for forcing air through said openings in said pair of plates and moving one of said plates,
   a push rod means connected between one of said electrode plates and one of the plates of said pneumatic power means, and
   spring means operatively connected to said push rod for opposing the force of said pneumatic power means whereby said one pneumatic plate is vibrated and said vibrations are transmitted by said push rod means to said one electrode plate to cause it to move towards and away from the other of said electrode plates, and said one electrode plate, push rod and spring means are mechanically resonant at the same frequency as said one plate of said pneumatic power means.

9. The structure of claim 8 wherein said surfaces and openings of said pair of plates are further defined as being annular rings and slots respectively.

10. The structure of claim 9 wherein each of said rings and slots in registration with each other have substantially the same width to provide substantially mating relationship therebetween.

11. The structure of claim 6 wherein said ring element is resilient and is secured to said other plate of said pneumatic power means.

12. The structure of claim 1 wherein said pair of plates of said pneumatic power means separate sufficiently during each cycle of operation for air therebetween to exit between said ring means and the adjacent surface of said one plate of said power means.

13. The structure of claim 8 wherein said pair of plates of said power means separate sufficiently during each cycle of operation for air to pass through openings in one plate and past the surfaces in the other plate and exit out the openings in the other plate.

No references cited.

MILTON O. HIRSHFIELD, *Primary Examiner.*

D. F. DUGGAN, *Assistant Examiner.*